United States Patent [19]

McEntire

[11] 4,094,827

[45] June 13, 1978

[54] SUBSTITUTED UREAS AS POLYURETHANE CATALYSTS

[75] Inventor: Edward E. McEntire, Austin, Tex.

[73] Assignee: Texaco Development Corporation, New York, N.Y.

[21] Appl. No.: 733,547

[22] Filed: Oct. 18, 1976

[51] Int. Cl.² .................. C08G 18/16; C08G 18/18
[52] U.S. Cl. .................. 260/2.5 AC; 260/75 NC; 260/77.5 AC; 260/553 R
[58] Field of Search .............. 260/2.5 AC, 77.5 AC, 260/75 NC, 553 R

[56] References Cited

U.S. PATENT DOCUMENTS

| 3,836,488 | 9/1974 | Pruitt et al. | 260/77.5 AC |
| 4,007,140 | 2/1977 | Ibbotson | 260/77.5 AC |

*Primary Examiner*—M. J. Welsh

*Attorney, Agent, or Firm*—Carl G. Ries; Thomas H. Whaley; James L. Bailey

[57] ABSTRACT

Covers a method of producing a polyurethane by utilizing compounds of the structure below as catalysts in reacting an organic polyisocyanate with an organic polyester polyol or polyether polyol in the presence of said catalyst:

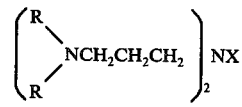

where R is lower alkyl and X is hydrogen or $CONR_1R_2$ where $R_1$ and $R_2$ are independently selected from the group consisting of hydrogen, alkyl and aryl with the proviso that both $R_1$ and $R_2$ may not be aryl.

11 Claims, No Drawings

SUBSTITUTED UREAS AS POLYURETHANE CATALYSTS

BACKGROUND OF THE INVENTION

1. Field of the Invention

This invention pertains to the field of urethane catalysts. More particularly, this invention relates to the use of certain amines as urethane catalysts.

2. Description of the Prior Art

The use of a catalyst in preparing polyurethanes by the reaction of a polyisocyanate, a polyol and perhaps other ingredients is known. The catalyst is employed to promote at least two, and sometimes three major reactions that must proceed simultaneously and competitively at balanced rates during the process in order to provide polyurethanes with the desired physical characteristics. One reaction is a chain extending isocyanate-hydroxyl reaction by which a hydroxyl-containing molecule is reacted with an isocyanate-containing molecule to form a urethane. This increases the viscosity of the mixture and provides a polyurethane containing secondary nitrogen atom in the urethane groups. A second reaction is a cross-linking isocyanate urethane reaction by which an isocyanate-containing molecule reacts with a urethane group containing a secondary nitrogen atom. The third reaction which may be involved is an isocyanate-water reaction by which an isocyanate-terminated molecule is extended and by which carbon dioxide is generated to blow or assist in the blowing of the foam. This third reaction is not essential if an extraneous blowing agent, such as a halogenated, normally liquid hydrocarbon, carbon dioxide, etc., is employed, but is essential if all or even a part of the gas for foam generation is to be generated by this in situ reaction (e.g. in the preparation of "one-shot" flexible polyurethane foams.)

The reactions must proceed simultaneously at optimum balanced rates relative to each other in order to obtain a good foam structure. If carbon dioxide evolution is too rapid in comparison with chain extension, the foam will collapse. If the chain extension is too rapid in comparison with carbon dioxide evolution, foam rise will be restricted, resulting in a high density foam with a high percentage of poorly defined cells. The foam will not be stable in the absence of adequate crosslinking.

It has long been known that tertiary amines, such as trimethylamine, triethylamine, etc., are effective for catalyzing the second crosslinking reaction. Other typical tertiary amines are set forth in U.S. Pat. Nos. 3,925,268; 3,127,436; and 3,243,389 and German OLS 2,354,952 and 2,259,980. Some of the tertiary amines are effective for catalyzing the third water-isocyanate reaction for carbon dioxide evolution. However, tertiary amines are only partially effective as catalysts for the first chain extension reaction. To overcome this problem, the so-called "prepolymer" technique has been developed wherein a hydroxy-containing polyol component is partially reacted with the isocyanate component in order to obtain a liquid prepolymer containing free isocyanate groups. This prepolymer is then reacted with additional polyol in the presence of a tertiary amine to provide a foam. This method is still commonly employed in preparing rigid urethane foams, but has proven less satisfactory for the production of flexible urethane foams.

For flexible foams, a one-step or "one-shot" process has been developed wherein a tertiary amine, such as triethylenediamine, is employed in conjunction with an organic tin compound. Triethylenediamine is particularly active for promoting the water-isocyanate reaction and the tin compound is particularly active in synergistic combination with the triethylenediamine for promoting the chain extension reaction. However, even here, the results obtained leave much to be desired. Triethylenediamine is a solid and must be dissolved prior to use to avoid processing difficulties. Also, triethylenediamine and other of the prior art amines can impart a strong amine odor to the polyurethane foam.

In addition to problems of odor and handling due to solid character other tertiary amines suffer still further deficiencies. For example, in some instances the compounds are relatively high in volatility leading to obvious safety problems. In addition, some catalysts of this type do not provide sufficient delay in foaming, which delay is particularly desirable in molding applications to allow sufficient time to situate the preform mix in the mold. Yet other catalysts, while meeting specifications in this area, do not yield foams with a desirable tack-free time.

Lastly, while certain tertiary amines are somewhat suitable in this catalysis often even they nevertheless do not have a sufficiently high tertiary amine content in terms of the number of tertiary amines compared to overall molecular weight. It is believed that the higher the tertiary amine content the more rapid the catalytic activity in the polyurethane art.

It would therefore be a substantial advance in the art if a new class of amine catalysts were discovered which overcome some of the just enumerated disadvantages of the prior art.

SUMMARY OF THE INVENTION

A new class of compounds have been found useful as polyurethane catalyst. The compounds have the following structural formula:

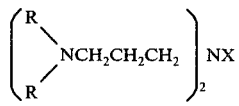

where R is lower alkyl and X is hydrogen or $CONR_1R_2$ where $R_1$ and $R_2$ are independently selected from the group consisting of hydrogen, alkyl and aryl with the single proviso that both $R_1$ and $R_2$ may not be aryl.

DESCRIPTION OF THE PREFERRED EMBODIMENTS

The compounds here may be prepared by resorting to a wide variety of synthetic techniques. However, preferably these compositions are prepared by first making bis(dialkylaminopropyl)-amine which I have also found useful as a urethane catalyst. The bis-amine again may also be prepared by a variety of known techniques. However, one excellent mode or preparation involves reaction of dimethylamine with acrylonitrile followed by hydrogenation of the resultant condensate to produce dimethylaminopropylamine. In producing the dimethylaminopropylamine, one also produces bis-(dimethylaminopropyl)amine which may be removed from dimethylaminopropylamine by conventional means such as distillation and the like.

The bis-amine, which as noted above has itself been found useful as a urethane catalyst is then reacted with urea or alkyl or aryl isocyanates to form the urea or substituted urea adducts. When an alkyl isocyanate is utilized as a reactant, it is preferred that it be a lower alkyl isocyanate whereas the alkyl group contains 1–4 carbon atoms. Preferably, when an aryl isocyanate is utilized, it is a phenyl isocyanate or a substituted phenyl isocyanate where the substituent is a halo, nitro, cyano or alkyl substituent.

It is believed that where $R_1$ and $R_2$ are hydrogen the compound prepared is itself novel. Thus, X in such instance is $CONH_2$.

The compounds here possess a number of useful characteristics making them exceptionally attractive as polyurethane catalysts. For example, the just defined compounds have a high tertiary amine content and resultant rapid catalytic activity in the polyurethane foam area. Tertiary amine content is calculated as the number of tertiary amines divided by the molecular weight times 1,000. For example, N,N-bis(dimethylaminopropyl)urea has a tertiary amine content of 8.7 meq/g. Further catalysis of the urethane reactions is gained from the urea function in the catalyst compound. In addition, the compounds here are also relatively non-volatile and possess little if any odor. With respect to the products, there are no solids handling problems such as are present with well known polyurethane catalysts as triethylenediamine. The catalysts of the invention are particularly desirable in foaming urethane formations in that they provide a sufficient delay in the foaming operation to aid in processing. Yet the catalysts also give good foams with desirable tackfree times. As noted above, this delay time is particularly desirable in molding applications to allow sufficient time to situate the prefoam mix in the mold. Further, the compounds are easily prepared as typically described above, and are relatively inexpensive. Lastly, since the compounds possess an active hydrogen in the molecule the catalyst will be chemically bound to the finished urethane and will have no tendency therefore to diffuse out causing odor and/or oily film problems.

The successful use of compounds such as bis-(dimethylaminopropyl)-amine as urethane catalysts is somewhat unexpected, since such compounds may be considered easily deactivated as catalysts due to their immobility after their combination with isocyanate groups in the reacting polymer and polyisocyanate. The basic NH linkage is very reactive with isocyanates. Thus, it is surprising that such amines give a cured foam when it is used as the exclusive catalyst. It is believed that even if this novel catalyst does react with an isocyanate, a high amine equivalent catalyst remains in the reacting polymer mixture, namely a urea function which is apparently still an effective catalyst.

To prepare polyurethanes using the catalysts here any aromatic polyisocyanate may be used. Typical aromatic polyisocyanates include m-phenylene diisocyanate, p-phenylene diisocyanate, polymethylene polyphenylisocyanate, 2,4-toluene diisocyanate, 2,6-tolylene diisocyanate, dianisidine diisocyanate, bitolylene diisocyanate, naphthalene-1,4-diisocyanate, diphenylene-4,4'-diisocyanate, aliphatic-aromatic diisocyanates, such as xylylene-1,4-diisocyanate, xylylene-1,3-diisocyanate, bis(4-isocyanatophenyl) methane, bis(3-methyl-4-isocyanatophenyl) methane, and 4,4'-diphenylpropane diisocyanate.

Greatly preferred aromatic polyisocyanates used in the practice of the invention are 2,4- and 2,6- toluene diisocyanates and methylene-bridged polyphenyl polyisocyanate mixtures which have a functionality of from about 2 to about 4. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts. Known processes for preparing the methylene-bridged polyphenyl polyamines and corresponding methylene-bridged polyphenyl polyisocyanates therefrom are described in the literature and in many patents, for example, U.S. Pat. Nos. 2,683,730; 2,950,263; 3,012,008; 3,344,162; and 3,362,979.

Most preferred methylene-bridged polyphenyl polyisocyanate mixtures used here contain from about 20 to about 100 weight percent methylene diphenyldiisocyanate isomers with the remainder being polymethylene polyphenyl diisocyanates having higher functionalities and higher molecular weights. Typical of these are polyphenyl polyisocyanate mixtures containing about 20 to 100 weight percent methylene diphenyldiisocyanate isomers, of which 20 to about 95 weight percent thereof is the 4,4'-isomer with the remainder being polymethylene polyphenyl polyisocyanates of higher molecular weight and functionality that have an average functionality of from about 2.1 to about 3.5. The isocyanate mixtures are known commercially available materials and can be prepared by the process described in U.S. Pat. No. 3,362,979, issued Jan. 9, 1968 to Floyd E. Bentley.

The hydroxyl-containing polyol component which reacts with the isocyanate may suitably be a polyester polyol or a polyether polyol having a hydroxyl number ranging from about 700 to about 25, or lower. When it is desired to provide a flexible foam, the hydroxyl number is preferably in the range from about 25 to 60. For rigid foams, the hydroxyl number is preferably in the range from 350 to 700. Semi-rigid foams of a desired flexibility are provided when the hydroxyl number is intermediate to the ranges just given.

When the polyol is a polyester, it is preferable to use, as the polyester, a resin having a relatively high hydroxyl value and a relatively low acid value made from the reaction of a polycarboxylic acid with a polyhydric alcohol. The acid component of the polyester is preferably of the dibasic or polybasic type and is usually free of reactive unsaturation, such as ethylenic groups or acetylenic groups. The unsaturation, such as occurs in the rings of such aromatic acids as phthalic acid, terephthalic acid, isophthalic acid, or the like, is nonethylenic and non-reactive. Thus, aromatic acids may be employed for the acid component. Aliphatic acids, such as succinic acid, adipic acid, sebacic acid, azelaic acid, etc., may also be employed. The alcohol component for the polyester should preferably contain a plurality of hydroxyl groups and is preferably an aliphatic alcohol, such as ethylene glycol, propylene glycol, dipropylene glycol, diethylene glycol, glycerol, pentaerthyritol, trimethyloethane, trimethylolpropane, mannitol, sorbitol, or methyl glucoside. Mixtures of two or more of the above identified alcohols may be employed also if desired. When a flexible urethane foam is desired, the polyol should preferably have an average functionality of from about 2 to about 4 and a molecular weight of from about 2,000 to about 4,000. For rigid foams, the functionality of the polyol component is preferably from about 4 to about 7.

When the hydroxyl-containing component is a polyether polyol for use in flexible polyurethane foam, the polyol may be an alkylene oxide adduct of a polyhydric alcohol with a functionality of from about 2 to about 4. The alkylene oxide may suitably be ethylene oxide, propylene oxide, or 1,2-butylene oxide, or a mixture of some or all of these. The polyol will suitably have a molecular weight within the range of from about 2,000 to about 7,000. For flexible polyether polyurethane foams, the alkylene oxide is preferably propylene oxide or a mixture of propylene oxide and ethylene oxide and the hydroxyl number is preferably within the range of about 25 to 60.

For rigid polyether polyurethane foams, the polyol should have a functionality of from about 4 to about 7 and a molecular weight of from about 300 to about 1200. Polyols for rigid polyether polyurethane foams may be made in various ways including the addition of an alkylene oxide as above to a polyhydric alcohol with a functionality of from 4 to 7. These polyols may also be, for example, Mannich condensation products of a phenol, an alkanolamine, and formaldehyde, which Mannich condensation product is then reacted with an alkylene oxide. See U.S. Pat. No. 3,297,597.

The amount of hydroxyl-containing polyol compound to be used relative to the isocyanate compound in both polyester and polyether foams normally should be such that the isocyanato groups are present in at least an equivalent amount, and preferably, in slight excess, compared with the free hydroxyl groups. Preferably, the ingredients will be proportioned so as to provide from about 1.05 to about 1.5 mol equivalents of isocyanato groups per mol equivalent of hydroxyl groups. However, for certain shock absorbing foams we have found that by using the catalysts of our invention the mol equivalents of isocyanate to hydroxyl groups can be as low as 0.4.

When water is used, the amount of water, based on the hydroxyl compound, is suitably within the range of about 0.05 to about 5.0 mol per mol equivalent of hydroxy compound.

It is within the scope of the present invention to utilize an extraneously added inert blowing agent such as a gas or gas-producing material. For example, halogenated low-boiling hydrocarbons, such as trichloromonofluoromethane and methylene chloride, carbon dioxide, nitrogen, etc., may be used. The inert blowing agent reduces the amount of excess isocyanate and water that is required in preparing flexible urethane foam. For a rigid foam, it is preferable to avoid the use of water and to use exclusively the extraneous blowing agent. Selection of the proper blowing agent is well within the knowledge of those skilled in the art. See for example U.S. Pat. No. 3,072, 082.

The catalysts discovered here as useful in the preparation of rigid or flexible polyester or polyether polyurethane foams based on the combined weight of the hydroxyl-containing compound and polyisocyanate, are employed in an amount of from about 0.05 to about 4.0 weight percent. More often that the amount of catalyst used is 0.1-1.0 weight percent.

The catalysts of this invention may be used either alone or in a mixture with one or more other catalysts such as other tertiary amines or with an organic tin compound or other polyurethane catalysts. The organic tin compound, particularly useful in making flexible foams may suitably be a stannous or stannic compound, such as a stannous salt of a carboxylic acid, a trialkyltin oxide, a dialkyltin dihalide, a dialkyltin oxide, etc., wherein the organic groups of the organic portion of the tin compound are hydrocarbon groups containing from 1 to 8 carbon atoms. For example, dibutyltin dilaurate, dibutyltin diacetate, diethyltin diacetate, dihexyltin diacetate, di-2-ethylhexyltin oxide, dioctyltin dioxide, stannous octoate, stannous oleate, etc., or a mixture thereof, may be used.

Such other tertiary amines include trialkylamines (e.g. trimethylamine, triethylamine), heterocyclic amines, such as N-alkylmorpholines (e.g., N-methylmorpholine, N-ethylmorpholine, etc.), 1,4-dimethylpiperazine, triethylenediamine, etc., aliphatic polyamines, such as N,N,N'N'-tetramethyl-1,3-butanediamine.

Conventional formulation ingredients are also employed, such as, for example, foam stabilizers also known as silicone oils or emulsifiers. The foam stabilizer may be an organic silane or siloxane. For example, compounds may be used having the formula:

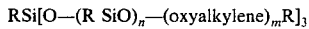

wherein R is an alkyl group containing from 1 to 4 carbon atoms; $n$ is an integer of from 4 to 8; $m$ is an integer of 20 to 40; and the oxyalkylene groups are derived from propylene oxide and ethylene oxide. See, for example, U.S. Pat. No. 3,194,773.

In preparing a flexible foam, the ingredients may be simultaneously, intimately mixed with each other by the so-called "one-shot" method to provide a foam by a one-step process. In this instance, water should comprise at least a part (e.g., 10% to 100%) of the blowing agent. The foregoing methods are known to those skilled in the art, as evidenced by the following publication: duPont Foam Bulletin, "Evaluation of Some Polyols in One-Shot Resilient Foams," Mar. 22, 1960.

When it is desired to prepare rigid foams, the "one-shot" method or the so-called "quasi-prepolymer method" is employed, wherein the hydroxyl-containing component preferably contains from about 4 to 7 reactive hydroxyl groups, on the average, per molecule.

In accordance with the "quasi-prepolymer method," a portion of the hydroxyl-containing component is reacted in the absence of a catalyst with the polyisocyanate component in proportions so as to provide from about 20 percent to about 40 percent of free isocyanato groups in the reaction product, based on the polyol. To prepare a foam, the remaining portion of the polyol is added and the two components are allowed to react in the presence to catalytic systems such as those discussed above and other appropriate additives, such as blowing agents, foam stabilizing agents, fire retardants, etc. The blowing agent (e.g., a halogenated lower aliphatic hydrocarbon), the foam-stabilizing agent, the fire retardant, etc., may be added to either the prepolymer or remaining polyol, or both, prior to the mixing of the component, whereby at the end of the reaction a rigid polyurethane foam is provided.

Urethane elastomers and coatings may be prepared also by known techniques in accordance with the present invention wherein a tertiary amine of this invention is used as a catalyst. See, for example, duPont Bulletin PB-2, by Remington and Lorenz, entitled "The Chemistry of Urethane Coatings."

The invention will be illustrated further with respect to the following specific examples, which are given by way of illustration and not as limitations on the scope of this invention.

EXAMPLE 1

To a 500 ml reactor was charged 200 g of dimethylaminopropylamine reactor bottoms (containing about 75% by weight bis-(dimethylaminopropyl)amine, (BDMAPA) and 69.5 g urea. Nitrogen was passed over the mixture as it was stirred and heated for 9 hr. at 150° C. Ammonia evolved during the heating period. The product was a viscous liquid containing 8.1 meq/g amine by titration. NMR and IR spectroscopy confirmed that the major material present was N,N-bis(dimethylaminopropyl)urea.

EXAMPLE 2

To a dry 500 ml reactor containing 73 g of distilled BDMAPA was added dropwise 42.4 ml of phenyl isocyanate by means of a constant addition funnel. The exothermic, stirred reaction was cooled by immersing the reactor in a water bath, never allowing the reaction temperature to exceed 50° C. A nitrogen atmosphere was maintained throughout the reaction. After the addition of phenyl isocyanate, the viscous reaction mixture was heated to 80° C and a vacuum applied to 0.4 mm of mercury and maintained for 30 min. After cooling, 119 g, 99.6% of N,N-bis(dimethylaminopropyl)-N'-phenylurea was isolated; this structure was confirmed by NMR and IR spectroscopy. The amine equivalent of the product was 6.69 meq/g. Viscosity was 207 cp. at 25° C.

EXAMPLE 3

To a 250 ml reactor containing 93.5 g of distilled BDMAPA equipped with a stirrer, thermometer, a nitrogen atmosphere, and an addition funnel was added dropwise over 0.5 hr 28.5 g of methyl isocyanate. Viscosity increased during the addition. The mixture was then stirred and heated by a hot water bath while applying a 0.5 mm vacuum for 0.5 hr. N,N-bis(dimethylaminopropyl)-N'-methylurea was isolated in 98.4% yield. NMR and IR spectroscopy confirmed the structure. Amine content was 8.0 meq/g. Viscosity was 148 cp at 25° C.

EXAMPLE 4

This example illustrates utility of compounds disclosed here as urethane catalysts in a flexible urethane formulation. The experiment consisted of mixing 48.4 parts toluene diisocyanate on a high speed mixer with the following blend of components:

| | |
|---|---|
| THANOL® F-3520 polyol[1] | 100 parts |
| Water | 4 parts |
| Silicone surfactant | 1 part |
| Stannous octoate | 0.6 parts |
| Test catalyst | 0.1 parts |

[1]A glycerine based polyether polyol of 3500 molecular weight containing 15% ethylene oxide available from Jefferson Chemical Co., Houston, Texas.

The blended components were poured into a mold and allowed to rise. Results:

| TEST CATALYST | RISE TIME | FOAM APPEARANCE |
|---|---|---|
| Catalyst of Example 1 | 100 sec | Good |
| Catalyst of Example 2 | 97 sec | Good |

EXAMPLE 5

This example illustrates further utility of the urethane catalysts of this invention. The components below were blended with a high speed stirrer, then poured into a standard mold and allowed to rise to provide a rigid foam.

| | PARTS BLENDED |
|---|---|
| MONDUR® MR Polyisocyanate | 46.6 |
| 2500 parts THANOL® RS-700 Polyol[2] | 52.4 |
| 34 parts Silicone surfactant | |
| 880 parts Fluorocarbon blowing agent | |
| Catalyst Tested | 1.0 |

The results are recorded below:

| CATALYST TESTED | CREAM TIME | TACK FREE TIME | RISE TIME |
|---|---|---|---|
| Catalyst from Example 3 | 56 sec | 190 sec | 305 sec |
| BDMAPA | 40 sec | 147 sec | 160 sec |

[1]Polyphenylmethylene polyisocyanate of average functionality 2.7, a product of Mobay Chemical Corp.
[2]A nine mole propoxylate of sorbitol

EXAMPLE 6

This example illustrates further use of catalysts in a flexible urethane formulation. The experiment was performed by mixing 49.7 parts of toluene diisocyanate with the formulation below on a high speed stirrer, then allowing the formulation to rise in a standard mold.

| | |
|---|---|
| THANOL® F-3000 Polyol | 100 parts |
| Water | 4.0 parts |
| Silicone surfactant | 1.0 parts |
| Tin catalyst | 0.7 parts |
| Catalyst tested | 0.1 parts |

[1]A 50 mole propoxylate of glycerine.

Results:

| CATALYST TESTD | CREAM TIME (SEC) | RISE TIME (SEC) |
|---|---|---|
| Catalyst from Example 1 | 10 | 87 |

I claim:

1. A method for producing a polyurethane which comprises reacting an organic polyisocyanate with an organic polyester polyol or polyether polyol in the presence of a catalytic amount of a compound having the following structural formula:

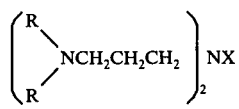

where R is lower alkyl and X is hydrogen or $CONR_1R_2$ where $R_1$ and $R_2$ are independently selected from the group consisting of hydrogen, alkyl and aryl with the proviso that both $R_1$ and $R_2$ may not be aryl.

2. The method of claim 1 wherein said organic polyisocyanate has a functionality of from 2 to 4, and said organic polyester or polyether polyol has a hydroxyl number of from about 25 to 700.

3. The method of claim 1 wherein R in said structural formula is methyl.

4. The method of claim 3 wherein X is hydrogen.

5. The method of claim 3 wherein X is $CONR_1R_2$ and $R_1$ and $R_2$ are hydrogen.

6. The method of claim 3 where X is $CONR_1R_2$ and $R_1$ is hydrogen and $R_2$ is methyl.

7. The method of claim 3 where X is $CONR_1R_2$ and $R_1$ is hydrogen and $R_2$ is phenyl.

8. A method for producing a flexible polyether polyurethane foam according to claim 2 which comprises reacting in the presence of a blowing agent said organic polyisocyanate with a polyether polyol formed by the addition reaction of an alkyleneoxide of 2 to 4 carbon atoms to a polyhydric alcohol having a functionality of from 2 to about 4 in the presence of said catalyst, said organic polyisocyanate being employed in an amount sufficient to provide 0.4 to 1.5 mol equivalents of isocyanato groups per mol equivalent of hydroxyl groups, said polyether polyol having a molecular weight within the range of about 2000–7000, and a hydroxyl number of from about 25 to 60.

9. A method for producing a rigid polyether polyurethane foam according to claim 2 which comprises reacting in the presence of a blowing agent said organic polyisocyanate with a hydroxy terminated polyether in the presence of said catalyst, said polyisocyanate being employed in an amount sufficient to provide 0.4 to 1.5 mol equivalents of isocyanato groups per mol equivalent of a hydroxy group in the hydroxy terminated polyether, said polyether having from about 4 to about 7 hydroxy groups per molecule, a molecular weight within the range from 300 to about 1200 and a hydroxyl number within the range of 350 to 700.

10. A method for producing a flexible polyester polyurethane foam according to claim 2 which comprises reacting in the presence of a blowing agent toluene diisocyanate with a hydroxyl terminated condensation product of a polycarboxylic acid and a polyhydric alcohol in the presence of said catalyst, said toluene diisocyanate being employed in an amount sufficient to provide 1.0 to 1.5 mol equivalents of isocyanato groups per mol equivalent of hydroxyl groups, said condensation product having a functionality of from about 2 to about 4, and a molecular weight from about 2,000 to about 4,000, and a hydroxyl number ranging from about 20 to about 60.

11. A compound of the formula:

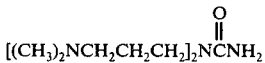

* * * * *